(12) United States Patent
Shanks et al.

(10) Patent No.: US 10,968,726 B2
(45) Date of Patent: Apr. 6, 2021

(54) SYSTEMS AND METHODS OF POWER TRANSMISSION FOR DOWNHOLE APPLICATIONS

(71) Applicant: Alkhorayef Petroleum Company Limited, Al-Khobar (SA)

(72) Inventors: David S Shanks, Aberdeen (GB); Jedrzej Pietryka, Gdansk (PL); Janusz Szewczyk, Gdansk (PL); Jaroslw Samsel, Rumia (PL); Zbigniew Krzeminski, Gdansk (PL)

(73) Assignee: Alkhorayef Petroleum Company Limited, Al-Khobar (SA)

( * ) Notice: Subject to any disclaimer, the term of this patent is extended or adjusted under 35 U.S.C. 154(b) by 1109 days.

(21) Appl. No.: 15/415,339

(22) Filed: Jan. 25, 2017

(65) Prior Publication Data

US 2018/0209252 A1 Jul. 26, 2018

(51) Int. Cl.
| | |
|---|---|
| *E21B 41/00* | (2006.01) |
| *E21B 17/00* | (2006.01) |
| *H02P 29/032* | (2016.01) |
| *E21B 47/008* | (2012.01) |
| *E21B 43/12* | (2006.01) |

(52) U.S. Cl.
CPC .......... *E21B 43/128* (2013.01); *E21B 17/003* (2013.01); *E21B 41/0085* (2013.01); *E21B 47/008* (2020.05); *H02P 29/032* (2016.02)

(58) Field of Classification Search
CPC .... E21B 43/128; E21B 47/008; E21B 17/003; E21B 41/0085; H02P 29/032
See application file for complete search history.

(56) References Cited

U.S. PATENT DOCUMENTS

| | | | |
|---|---|---|---|
| 2013/0255933 A1* | 10/2013 | Shen ...................... | E21B 43/128 166/68.5 |
| 2016/0006481 A1* | 1/2016 | Rendusara ................ | F04D 1/06 340/854.9 |
| 2017/0122074 A1* | 5/2017 | Robertson ............... | E21B 41/00 |

\* cited by examiner

*Primary Examiner* — Tung X Nguyen
*Assistant Examiner* — Feba Pothen
(74) *Attorney, Agent, or Firm* — Jones Day

(57) ABSTRACT

A power transmission system and method for transmitting power over a three-phase power system on a multi-conductor power cable between a surface and a sub-surface location are provided. A surface system includes a power supply providing a direct current (DC) power signal to the power cable. A sub-surface system includes a downhole system coupled to a Y-point of a downhole motor. The downhole system is configured to be powered by (i) the DC power signal provided by the surface system, (ii) alternating current (AC) power drawn from the Y-point, and (iii) a combination of the DC power and the AC power. The downhole system is powered by the DC power when the power cable does not have an insulation fault, and the downhole system is powered by the AC power or the combination of the DC power and the AC power when the power cable has an insulation fault.

11 Claims, 11 Drawing Sheets

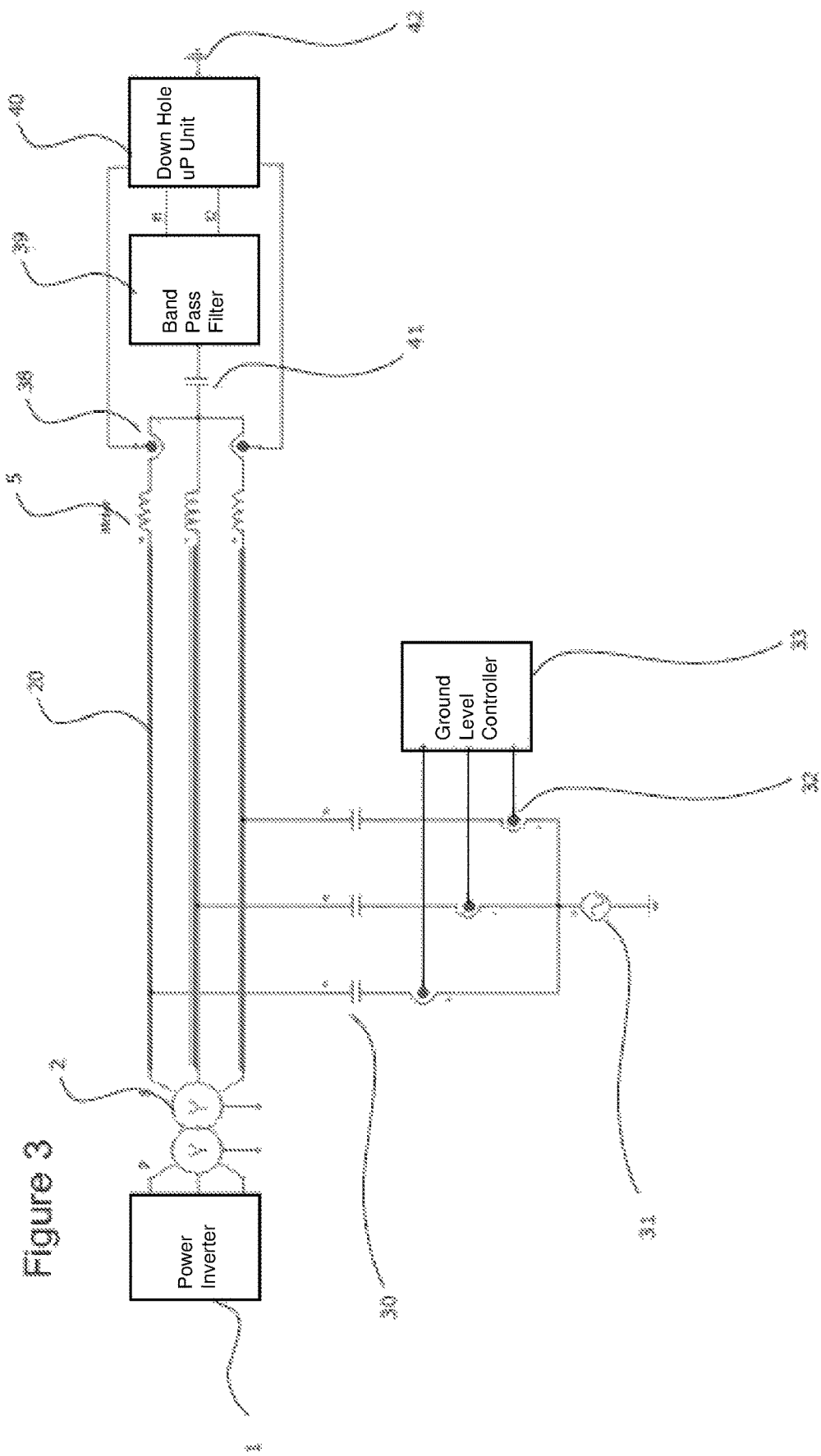

Typical electrical circuit of an ESP pump with a gauge

SYSTEMS AND METHODS OF POWER TRANSMISSION FOR DOWNHOLE APPLICATIONS

FIELD

The technology described herein relates generally to power transmission and more particularly to systems and methods for transmitting power between a surface location and a sub-surface location under different operating conditions.

BACKGROUND

Various devices are known in the oil industry for monitoring submersible pumps, and in particular, devices which superimpose data on the three-phase power cable that connects such pumps when deployed downhole to surface equipment. These monitoring devices generally rely on the ground isolation of the three-phase system to allow power to be delivered to the downhole gauge or like downhole instruments, and data to be recovered from those instruments at the surface. These systems remove the need for a separate cable to be installed between the downhole gauge and the surface. Most conventional systems utilize a direct current (DC) power source at the surface, providing power to the power cable, and a downhole device which, also connected to the power cable, modulates the DC current supply in a manner that transmits information either as digital bit streams or analog signal variations like pulse width or amplitude modulation. These conventional power transmission systems are negatively affected by and frequently fail completely as a result of insulation faults in the three-phase power system that create DC power shorts.

The description above is presented as a general overview of related art in the field of power transmission and should not be construed as an admission that any of the information it contains constitutes prior art against the present disclosure.

For the purpose of this document the complete downhole assembly including mechanical components, electrical components, processors, measurement sensors and circuits is referred to as a "gauge" or a "downhole gauge"; the complete piece of equipment including the downhole gauge and its power cable couplings, and the surface power supply and associated decoding circuitry and software will be referred to as "the system" or "the gauge system". Devices employed downhole to measure properties of the environment around the gauge will be referred to as sensors, or transducers. Where reference is made to the complete pumping system and the overall pumping equipment that this gauge system monitors we will refer to this as the "pumping system", or the "artificial lift system".

SUMMARY

Examples of an improved power transmission system and method of transmitting power are provided. An example power transmission system for transmitting power over a three-phase power system on a multi-conductor power cable coupled between a surface location and a sub-surface location includes a surface system. The surface system includes a power supply providing a direct current (DC) power that is coupled to the multi-conductor power cable. A sub-surface system is coupled to the surface system via the multi-conductor power cable and includes a downhole motor including a Y-point. The sub-surface system also includes a downhole system coupled between the Y-point and a ground reference. The downhole system is configured to be powered, dependent on the condition of the power cable, by (i) the DC power signal provided by the surface system, (ii) alternating current (AC) power drawn from the Y-point, or (iii) a combination of the DC power from the surface system and AC power drawn from the Y-point. In particular, the downhole system is powered by the DC power when the power cable does not have an insulation fault, and is powered by the AC power or a combination of the DC power and the AC power when the power cable has an insulation fault.

In an example method for transmitting power between a surface location and a sub-surface location, a direct current (DC) power is provided to a multi-conductor power cable. The multi-conductor power cable couples equipment in the sub-surface location to equipment on the surface. A downhole system coupled between a Y-point of a downhole motor and a ground reference is powered by the DC power when the power cable does not have an insulation fault, and is powered by (i) alternating current (AC) power drawn from the Y-point, or (ii) a combination of the DC power and the AC power when the power cable has an insulation fault.

Also provided is a downhole system. An example downhole system is coupled to a Y-point of a sub-surface motor operating an electric submersible pump (ESP). The sub-surface motor is coupled to a surface system via a three-phase power cable. The downhole system includes one or more circuits and sensors. The downhole system further includes an attenuator circuit coupled to the Y-point of the sub-surface motor. The attenuator circuit is configured to modify AC voltage that is present at the Y-point to a desirable operating level and characteristics. The downhole system also includes a voltage regulator coupled to the attenuator circuit, where the voltage regulator is configured to power the one or more sub-surface circuits and measurement devices using the AC signal present at the Y-point.

To explain this power transmission method more clearly, the following description outlines the nature of ground faults and also how it is used in the present power system.

In one embodiment, the DC power supply at the surface location of the power transmission system is applied to all three phase conductors of the power cable equally and this power supply is present at the motor Y-point in the downhole assembly. Because the 3-phase power system is both balanced and isolated from ground there is no AC voltage present at the surface or down hole Y-points.

If ground faults develop in the system, these faults can effectively be modeled as resistive connections (shorts) between one or more of the phase conductors and ground.

These faults are normally caused by breakdown of the cable insulation because of ageing of the insulating material or mechanical or chemical damage done when the cable is deployed. As illustrated below, the resistive connection of any fault to ground now appears in the circuit model in parallel with the downhole gauge electronics. These faults thus will draw current from the surface-based gauge power supply and if they are of sufficiently low resistance will cause collapse of the surface power supply when the supply current limit is reached and/or the voltage drop through the surface coupling inductors lowers the voltage in the ESP cable. In the case of such a collapse, the downhole gauge can no longer be powered, and the pumping system would have to be operated in the blind, not receiving any data from the sensors provided by the gauge system.

Notably, where all 3 conductors of the power cable have faults that have exactly equal resistance to ground, there will be no net effect on the AC voltages present on the surface or down hole Y-points because such AC voltages would balance out. However, since these faults typically result from localized damage or ageing of the insulation, as a practical matter they are never equal across the 3 phases and in operation create an imbalanced ground connection. This imbalance creates AC voltage on the two Y-point connections.

It is an aspect of this invention that in the case of an insulation fault, the downhole gauge may be operated on both DC and AC power. This approach is thus designed to harness the AC power which appears on the down hole Y-point because of the existence of imbalanced ground faults, and use this AC power in conjunction with the available DC supply where this is still present to power the downhole gauge. In this way, when the faults on the cable are high resistance the downhole gauge will still have the DC supply to work from and an injected AC voltage, keeping the gauge system operational.

In the event a fault gets worse, that is when resistance to ground drops, the DC supply will eventually collapse or be seriously reduced, but the AC voltages on the Y-points will be larger due to the increased imbalance. In this way, in accordance with one aspect the power for the downhole gauge is maintained regardless of the severity of the fault present.

BRIEF DESCRIPTION OF THE DRAWINGS

FIG. 3 depicts features of another example power transmission system, according to an embodiment.

DETAILED DESCRIPTION

In embodiments described herein, a power transmission system enables downhole equipment (e.g., any tool, equipment, or instrument that is used in a wellbore) to be powered in a variety of different manners dependent on the operational status of the equipment. In an example, the downhole equipment is configured to be powered by (i) a direct current (DC) power supply of a surface system, (ii) alternating current (AC) power that is drawn from a Y-point of a sub-surface motor system to which the downhole equipment is coupled, and (iii) a combination of the DC power and the AC power. The ability to operate under these different power conditions may be advantageous, for example, when a power cable that couples the downhole equipment to the surface system develops an insulation fault. When the power cable has an insulation fault, DC power supply to the downhole equipment may be limited (e.g., the insulation fault may sink some or all of the current provided by the DC power supply). Despite this limited DC power supply, the downhole equipment may continue to be adequately powered because of the downhole equipment's ability to be powered by AC power (e.g., rectified AC power) drawn from the Y-point. In different embodiments disclosed herein, the AC power present at the Y-point is a result of the insulation fault. The systems and methods described herein provide advantages over conventional systems, which may fail when the DC power supply becomes limited as a result of a ground short. These and other advantages of the instant disclosure are described in further detail below.

Figure 1:
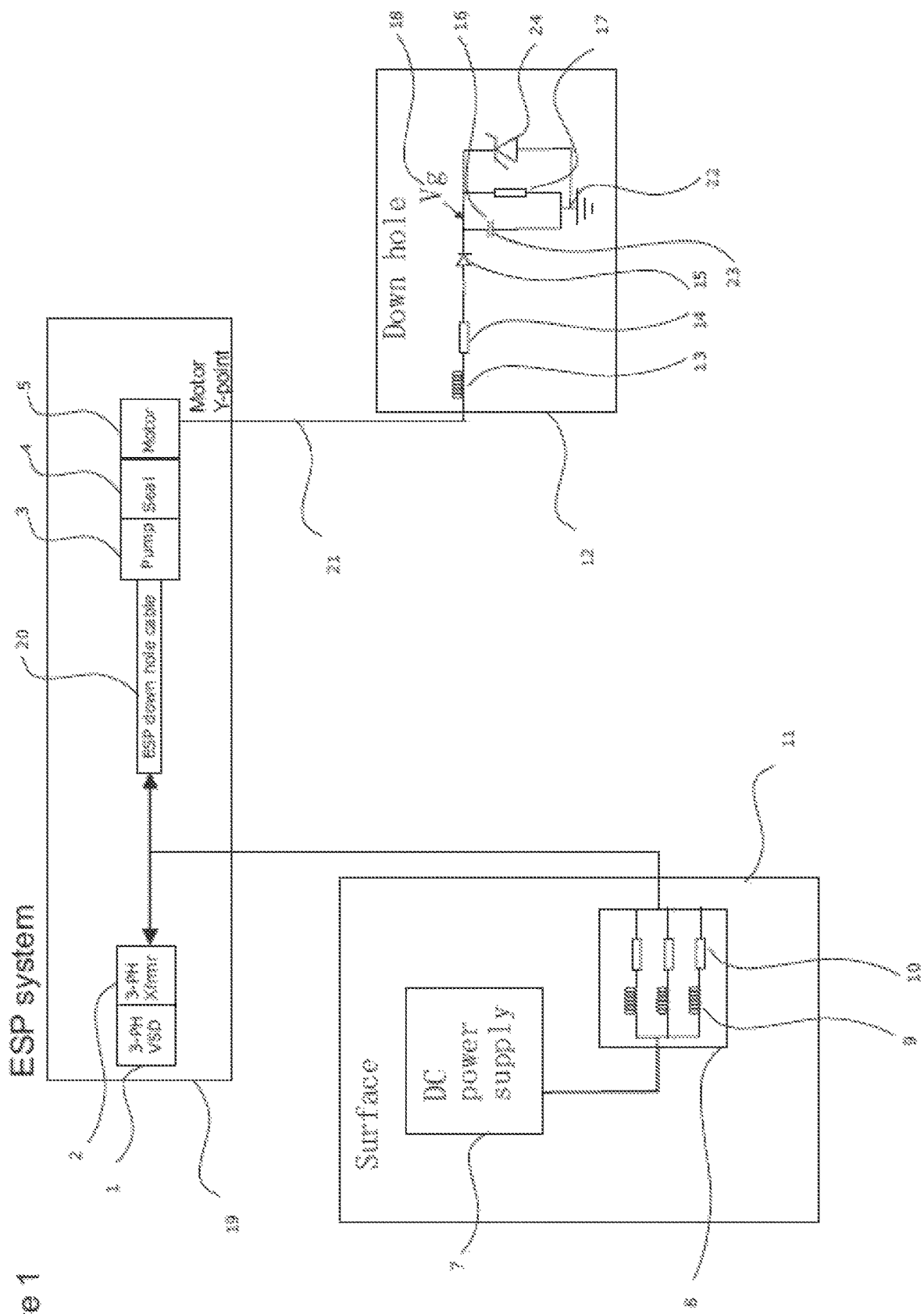
FIG. 1 depicts an example power transmission system for transmitting power over a three-phase power system on a multi-conductor power cable between a surface and a sub-surface location, according to an embodiment.

FIG. 1 depicts an example three-phase power transmission system for transmitting power on a multi-conductor power cable 20 between a surface 11 and a sub-surface location, according to an embodiment. In FIG. 1, an electric submersible pump (ESP) system 19 comprises a three-phase power supply utilizing a variable speed drive (VSD) 1 and/or a three-phase transformer 2. The ESP system 19 further includes a three-phase armored power cable 20 that carries power from the surface 11 to a downhole pump system comprising a pump 3, seal 4, and motor 5. In embodiments, the power cable 20 comprises a multi-conductor power cable. The motor 5 is a three-phase, Y-configuration motor driven by the VSD 1 and/or the transformer 2.

At the surface 11, a direct current (DC) power supply 7 is connected to the ESP system 19 via a Y-point configured star choke assembly 8. The DC power supply 7 provides a DC power signal that is coupled to the multi-conductor power cable 20. The DC power signal may be coupled, specifically, to each of the conductors of the multi-conductor power cable 20. In embodiments, the surface power supply 7 is a current-limited DC power supply. The star choke assembly 8 includes inductors 9 and current-limiting resistors 10 connected in series, with the inductors 9 and current-limiting resistors 10 being used to couple the DC power signal from the supply 7 to the ESP system 19. In embodiments, the DC power supply 7 has the capacity to provide more current than is required by an electronics system 12 of the downhole equipment, but DC power supply 7 limits its current output such that the provided current is not of such a high level that the inductors 9 must be physically large and heavy. The DC power supply 7 provides current on the order of 100's of mA, in some examples.

The aforementioned pump 3, seal 4, and motor 5 comprise components of a sub-surface system that is coupled to the surface 11 via the power cable 20. The sub-surface system further includes downhole gauge 12. In specific embodiments, downhole gauge 12 includes power regulation components, various electronics, and one or more measurement circuits and sensors. The motor 5 may be used to lift fluids from the sub-surface to the surface of a well, and the aforementioned downhole one or more measurement circuits or sensors may be used to monitor and transmit information about different aspects of their operation, parameters of the pumped fluid, or others. In FIG. 1, the downhole equipment 12 is represented in a simplified form, with the power regulation components, electronics, and one or more measurement circuits or sensors being represented by a single load resistor 17. In embodiments, an instrument system of the downhole equipment 12 is coupled between the Y-point 21 of the motor 5 and a ground reference voltage 22. The instrument system may include one or more measurement circuits or sensors and/or other components and electronics.

The downhole equipment 12 is connected to the motor Y-point 21 through an inductor 13, resistor 14, and diode 15 connected in series. In other embodiments, a capacitor is also connected in series with the inductor 13, resistor 14, and diode 15. The inductor 13 used in specific embodiments is a component that resists changes in the electric current passing through it, is configured to modify voltage at the Y-point 21, which can be DC voltage, an AC voltage, or a combination of DC and AC voltage. For example, as discussed above, when the power cable 20 has a ground insulation fault in one or more phases, the phase imbalance due to this fault causes an AC voltage to be present at the Y-point 21. With further reference to the discussion of FIG. 2, in different examples, the inductor 13 modifies (attenuates) the AC voltage at the Y-point 21; power derived from the Y-point is provided to other components of the downhole gauge 12 (e.g., a sensor/gauge power supply, circuits), thus providing power to these components. The use of power that is drawn from the motor Y-point 21 is described in further detail below. The above-described attenuation is a result of an internal copper resistance of the inductor 13, in examples. The resistor 14 coupled to the inductor 13 may be used to further limit reactive current and to smooth the signal derived from the Y-point.

A smoothing capacitor 23 is coupled to the diode 15 as depicted in the figure, and a voltage limiting device 24 is connected in parallel to the smoothing capacitor 23. Although the voltage limiting device 24 is depicted in FIG. 1 as being a Zener diode, it is noted that the voltage limiting device 24 in general may comprise different components, circuits, and/or devices in other embodiments. In general, the voltage limiting device 24 provides overvoltage protection and is configured to limit the voltage across one or more components of the downhole equipment 12, and thus protect the equipment by keeping it within standard operating parameters. In specific embodiments, instead of a Zener diode, the voltage limiting device 24 may be an active voltage regulation circuit. Although it is conventional to use large-wattage Zener diodes for providing overvoltage protection in power electronics, such Zener diodes may be ill-suited for use in sub-surface equipment. For instance, Zener diodes commonly fail, and replacing failed Zener diodes may be extremely impractical when the Zener diodes are used in sub-surface equipment. The active voltage regulation circuit used in alternate embodiments may be more robust than a Zener diode and less prone to failure, and may thus provide advantages over the conventional approaches. It is noted that components of the downhole equipment 12 have the capability to operate over a wide range of input power voltages. Thus, for example, one or more circuits and sensors, and/or other components of the downhole gauge 12 may have a relatively wide range of acceptable operating voltages, thus enhancing a reliability of the system under different operating conditions.

In embodiments, components (e.g., one or more measurement circuits, sensors, etc.) of the downhole equipment 12 are powered by the DC power signal provided by the DC power supply 7 when the power cable 20 does not have a ground insulation fault. For instance, the DC power supply 7 may generate DC current which is superimposed on three-phase AC current provided by the VSD 1 or transformer 2 to the motor 5. At Y-point 21 of the motor 5, the three-phase AC current sums to zero and only the DC current remains. This DC current is used to power the components of the downhole equipment 12.

Figure 2A:
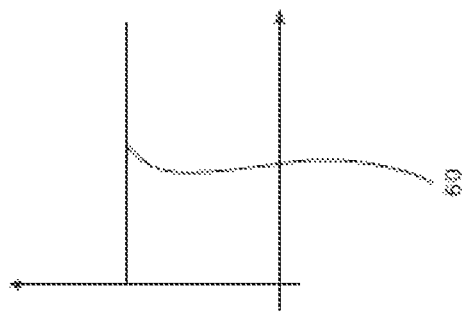
FIGS. 2A, 2B, and 2C are graphs depicting example voltages at a node Vg of the system of FIG. 1, according to an embodiment.

To illustrate the powering of the downhole equipment 12 from power provided by the DC power supply 7 when the power cable 20 does not have a ground insulation fault, reference is made to FIG. 2A. This figure is a graph depicting an example voltage waveform at a node Vg 18 of FIG. 1 when the power cable 20 does not have a ground insulation fault. In FIG. 2A (and in FIGS. 2B and 2C, described below), a Y-axis represents a voltage at the node Vg 18, and an X-axis represents time. FIG. 2A shows that the voltage at the node Vg 18 is a DC voltage 60 when the downhole equipment 12 is powered by the DC power signal provided by the DC power supply 7. Although the DC voltage 60 shown in FIG. 2A is fixed (i.e., constant voltage), it is noted that in other examples and embodiments, the DC voltage provided may be variable, that is, the DC voltage may change over time. Variable DC voltages may be used, for example, in the transmission of commands (e.g., commands comprising data and/or information) from the surface 11 to the downhole equipment 12, as described in further detail below.

In instances when the power cable 20 does not have a ground insulation fault, an AC voltage at the motor Y-point 21 is minimal, and in a fully balanced system is theoretically zero. By contrast, however, when the power cable 20 does have such an insulation fault, except for the rare case in which the fault is equally distributed along all phases, a certain level of AC voltage will appear on the motor Y-point 21. Specifically, when there is an insulation fault on the power cable 20, the fault is very rarely balanced across all three phases (e.g., because it is a fault and not an applied load) and so the AC voltage will appear on the downhole motor Y-point 21. In embodiments, when the power cable 20 has a ground insulation fault, components of the downhole equipment 12 are powered by (i) the AC voltage at the Y-point 21, and/or (ii) a combination of the AC voltage at the Y-point 21 and the DC power signal provided by the DC power supply 7.

The ability to power the downhole equipment 12, at least in part, using the AC voltage at the Y-point 21 provides advantages over conventional systems. For instance, when the power cable 20 has a ground insulation fault, this fault may sink some or all of the current provided by the DC power supply 7, thus limiting the DC power that is available to the downhole equipment 12. In conventional systems, when the DC power is limited in this manner, components (e.g., electronics, sensors, etc.) of the downhole equipment may have inadequate power and thus may fail or not operate properly. By contrast, in the approaches of the instant application, the downhole equipment 12 can be powered using the AC voltage at the Y-point 21, which may prevent failure of the downhole equipment 12 when the DC power supply from the surface becomes limited.

It should be appreciated that under the approaches of the instant disclosure, some or all of the DC power from the surface 11 can be sunk to insulation faults, and the system can still have sufficient current source capacity to power components (e.g., electronics, sensors, etc.) of the downhole equipment 12 completely. The approaches described herein enable use of DC power supply systems and the voltage imbalance at the Y-point in the motor system caused by power cable faults to provide power to the downhole equipment 12 over a range of operating conditions, including faults, that prior art systems could not handle. Notably, the power transmission systems described herein work in combination with any data transmission system that does not utilize current modulation to transmit data from the subsurface location to the surface 11, further improving the overall system behavior and the ability of the system operator to monitor its condition.

It should further be appreciated that the approaches described herein enable the components of the downhole equipment 12 to operate under different power conditions. In particular, the components of the downhole equipment 12 are configured to be powered by (i) the DC power from the DC power supply 7, (ii) AC power that is drawn from the motor Y-point 21, and (iii) a combination of the DC power and the AC power. The ability to operate under all three of these different power conditions, and the ability to ensure that variations in the DC power supply do not affect either the power or data signaling system is advantageous, for instance, because it enables the downhole equipment 12 to operate over a wide range of fault and load conditions.

To further illustrate the system's ability to operate under the different power conditions described above, reference is made again to FIG. 1. In this figure, the inductor 13 and resistor 14 connected in series may be considered to be an attenuator circuit. It is noted that this particular attenuator circuit is merely an example and that the attenuator circuit may include other components in alternate embodiments. The attenuator circuit comprising the inductor 13 and resistor 14 are configured to attenuate and limit a voltage at the motor Y-point 21. When the power cable 20 includes a ground insulation fault, the fault causes an AC voltage to be present at the Y-point 21, as described above. The attenuator circuit, coupled to the Y-point as seen in FIG. 1, attenuates this AC voltage at the Y-point 21.

The diode 15 and the smoothing capacitor 23 shown in FIG. 1 may be considered to be a voltage regulator. It is noted that the particular regulator of FIG. 1 is merely an example and that this regulator may include other components in alternate embodiments. The regulator comprising the diode 15 and smoothing capacitor 23 is coupled to the attenuator circuit and is configured to provide power to one or more components or electronic blocks of the downhole gauge 12. Such components or electronics may include, for instance, additional voltage regulators, measurement devices, sensors, and/or circuits of the gauge 12. The provided power is based on the attenuated voltage provided by the attenuator circuit. Thus, in examples, the attenuator circuit attenuates the AC voltage at the Y-point 21, and the regulator provides a power signal to components of the downhole gauge 12 that is based on the attenuated AC voltage. It is thus noted that the AC voltage present at the Y-point 21 is being used as a power source for powering components of the downhole gauge 12.

The diode 15 and smoothing capacitor 23 shown in FIG. 1 form a simple rectifier, an electrical device that converts an alternating current into a direct one by allowing a current to flow through it in one direction only. Those of skill in the art will appreciate that in different embodiments the system may use different rectifier circuits, enabling the AC power present at the Y-point 21 to be rectified before powering the components of the downhole gauge 12. Specifically, when the AC voltage is present at the Y-point 21, the diode 15 and smoothing capacitor 23 together generate a rectified version of this AC voltage, with the injected power signal being based on this rectified version of the AC voltage.

Figure 2B:
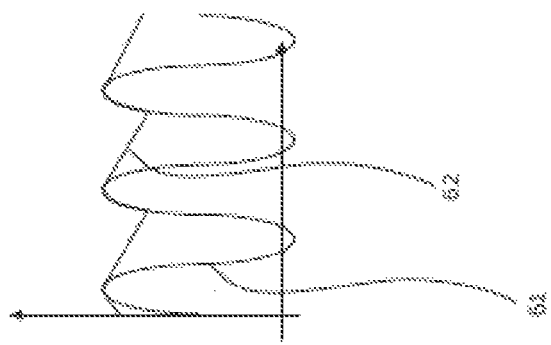
Figure 2C:
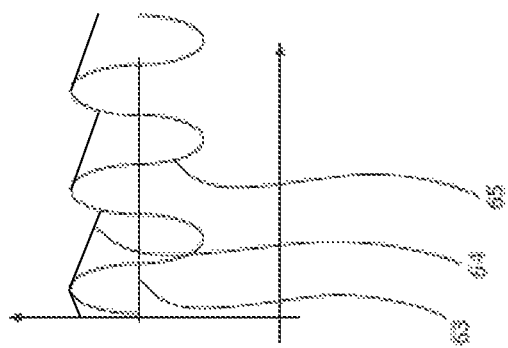

To illustrate the effects of the above-described simplified attenuator and injector circuits, reference is made to FIGS. 2B and 2C. As described above, when the power cable 20 has an insulation fault, the downhole equipment 12 is powered by (i) AC power derived from an AC voltage at the Y-point 21, or (ii) a combination of the AC power and DC power provided by the DC power supply 7. FIG. 2B is a graph depicting example voltage waveforms at the node Vg 18 of FIG. 1 when the power cable 20 has an insulation fault that has very low impedance. When the insulation fault has very low impedance to ground there will be small DC power component, but there will be a high AC voltage at the motor Y-point 21. The attenuator circuit attenuates the AC voltage, as shown at waveform 61 of FIG. 2B. The voltage regulator, illustrated here by the diode 15 and smoothing capacitor 23, generates a single-wave rectified version of the attenuated AC voltage, as shown at waveform 62 of FIG. 2B. As described herein, power derived from the rectified voltage is used to drive components of the downhole gauge 12.

FIG. 2C is a graph depicting example voltage waveforms at the node Vg 18 of FIG. 1 when the power cable 20 has a small to moderate leak to ground, i.e., a resistive fault that is not severe. When a resistive but not severe fault occurs there may be some reduced level of DC power available on the motor Y-point 21 and also some AC power available at the Y-point 21. The reduced level of DC power is represented by constant voltage waveform 63 of FIG. 2C, and the AC power is represented by the waveform 65. As a reminder, as the figure illustrates voltage waveforms at the node Vg 18, the voltage represented by the waveform 65 is voltage that has been attenuated by the attenuator circuit. The regulator, including the diode 15 and smoothing capacitor 23, generates a single-wave rectified version of the attenuated AC voltage, as shown at waveform 64 of FIG. 2C. As described herein, power derived from the rectified voltage is used to drive components of the downhole gauge 12.

FIG. 3 depicts features of another example power transmission system, according to an embodiment. This figure shows a three-phase ESP system with surface inverter drive 1 (corresponding to variable speed drive 1 in FIG. 1) and transformer 2 (corresponding to 3-phase transformer 2 in FIG. 1) feeding a surface-to-downhole cable 20 and a downhole motor 5 (corresponding to motor 5 in FIG. 1). In the example of FIG. 3, there is an AC power supply 31 at the surface for powering downhole equipment. The AC power supply 31 feeds through series controllers 32 of a ground-level (i.e., surface) controller 33 and is capacitively coupled via capacitors 30 to the main three-phase power system. A sub-surface (e.g., downhole) portion of the system includes the aforementioned motor 37, which is a three-phase motor including motor windings. Current transformers 38 are included in each motor winding, and a capacitor 41 is coupled to the motor Y-point, as shown in the figure. In embodiments, each of the current transformers 38 generates an AC current in a secondary winding that is proportional to an input current in a primary winding, and the generated AC current is coupled to the motor Y-point to provide additional power to a downhole system (e.g., the downhole gauge 12 of FIG. 1). The current transformers 38 built into the motor assembly may thus provide an alternative, additional power source that is relatively immune to faults in the cable 20. The system of FIG. 3 also includes a downhole power regulation system 40 and a filter 39 (e.g., a bandpass filter) to remove high voltage components of power coupled through the capacitor 41.

In comparing FIGS. 1 and 3, it is evident that (i) the system of FIG. 3 includes an AC power supply 31 at the surface, whereas the system of FIG. 1 includes only the DC power supply 7 at the surface, and (ii) the system of FIG. 3 includes the capacitor 41 directly coupled to the motor Y-point, whereas the system of FIG. 1 includes the series inductor-resistor-diode circuit directly coupled to the Y-point. Various other differences exist between the embodiments illustrated in these two figures. For instance, the illustration of FIG. 3 includes the motor windings 37, transformers 38, and other components that are not shown in the illustration of FIG. 1.

In embodiments of the instant disclosure, features of the system of FIG. 3 are used in combination with the system of FIG. 1. Thus, for instance, in embodiments, both DC and AC power supplies are utilized at the surface side for powering downhole equipment. To illustrate such an embodiment, reference is made to FIG. 4. This figure depicts an example power transmission system utilizing both DC and AC power supplies, according to an embodiment. The system of FIG. 4 may thus be characterized as a "dual mode power system," where there is both AC and DC power in the system, and downhole electronics can be powered by AC power, DC power, or a combination of the AC and DC power. It is further noted that the downhole equipment of FIG. 4, like that of FIG. 1, can draw additional power from the motor Y-point 21, where such power may be a result of power cable faults, as described above. For example, power cable faults cause an AC voltage to be present on the Y-point 21, and power derived from this AC voltage may be used to power components of the downhole equipment 12.

Figure 4:
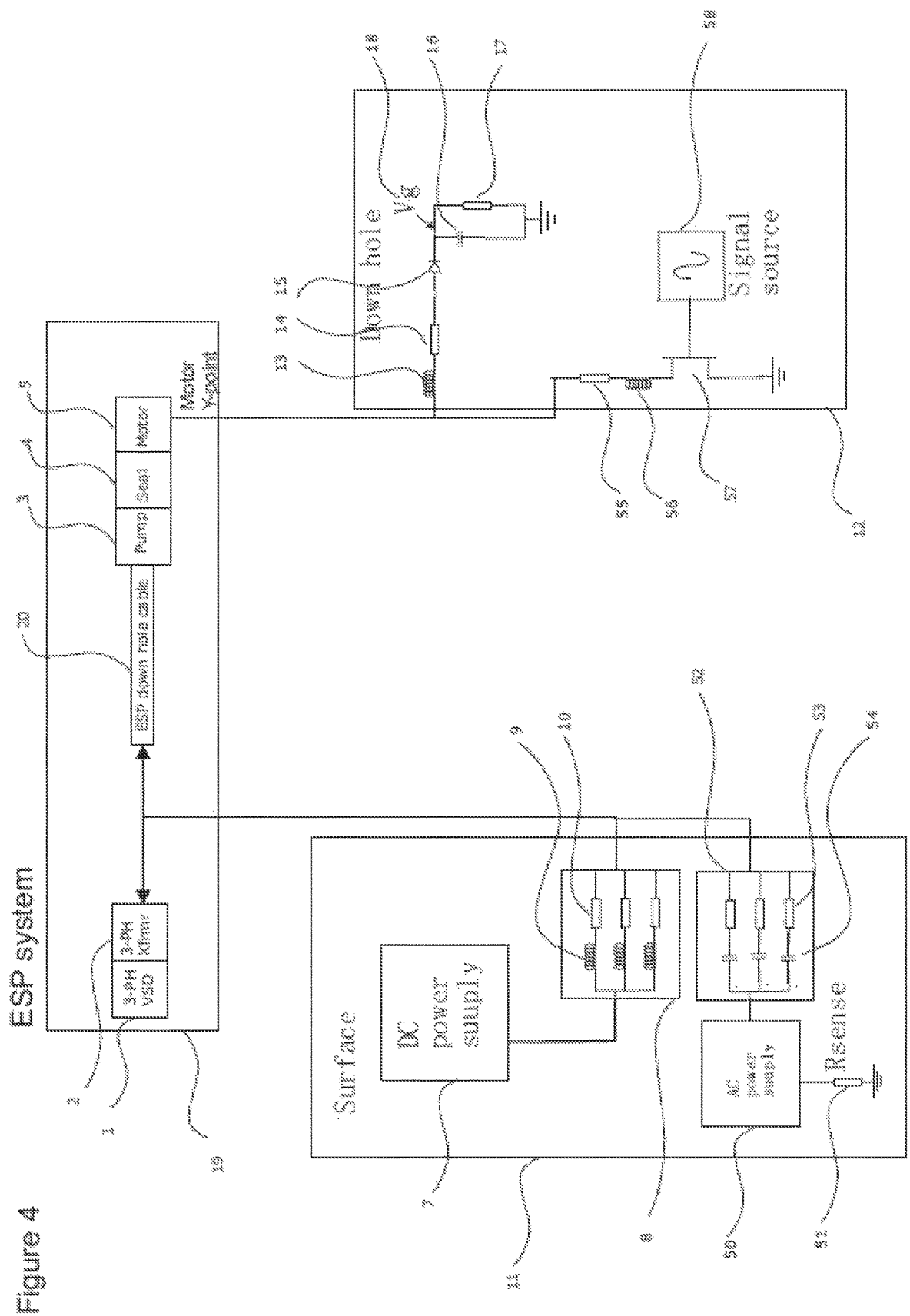
FIG. 4 depicts an example power transmission system utilizing both DC and AC power supplies, according to an embodiment.

The system of FIG. 4 includes parts that are the same as or similar to those of FIG. 1, and like reference numerals are used to designate like parts in these figures. Further, for brevity, the descriptions of features above with reference to FIG. 1 are not repeated here. In FIG. 4, an AC power source 50 is utilized in parallel with the DC power supply 7. The AC power supply 50 is connected to the ESP system 19 via an assembly 52 (e.g., a Y-point configured star choke assembly) that includes capacitors 54 and current limiting resistors 53, as illustrated in the figure. The capacitors 54 and resistors 53 of the assembly 52 may be used to couple an AC power signal from the supply 50 to the power cable 20. It is thus noted that in examples, the DC and AC power supplies 7, 50 provide respective DC and AC power signals to the power cable 20 in parallel. The AC power supply 50 may be coupled to a ground reference voltage via a resistor 51. The downhole unit 12 has a signal transmission device that includes a signal source 58 driving a signal shaping and amplification circuit illustrated as transistor 57. In the illustration, the signal transmission device is connected to the motor Y-point 21 via an inductor 56 and resistor 55. It is noted that the signal transmission device illustrated in FIG. 4 is only an example and that different signal transmission devices can be used in other embodiments.

In some embodiments, the DC power supply 7 and/or the AC power supply 50 on the surface are overrated to provide fault current so that components of the downhole equipment 12 do not fail when insulation faults draw current from the system. Specifically, where an insulation fault in the power cable 20 sinks a first amount of current provided by the DC power supply 7 and/or the AC power supply 50, the DC power supply 7 and/or the AC power supply 50 may be configured to generate extra amount of fault current that is in addition to the first amount of current. The fault current thus provides additional power for powering the downhole equipment 12 when the power cable 20 has an insulation fault. In embodiments, overrated power supplies are used in conjunction with other features described herein (e.g., deriving power from an AC voltage present at the motor Y-point 21, where the AC voltage results from an insulation fault) to help ensure that the system is operable over a wide range of fault conditions.

In powering components of the downhole equipment 12, the power derived from the different sources (e.g., AC power, DC power, a combination of AC and DC power) may be delivered to a power supply (e.g., a sensor/gauge power supply, etc.) of the downhole equipment 12. In embodiments, the power supply of the downhole equipment 12 is configured to operate over a wide range of input voltages, thus enabling the downhole electronics to operate over a wide range of fault conditions. For instance, a power level available to the downhole electronics may vary depending on whether AC power, DC power, or a combination of AC and DC power is used. The power supply of the downhole equipment is configured to operate in all three power conditions, despite the differences in the available power level, and providing uninterrupted operation of the equipment.

Additionally, in embodiments, the DC power supply 7 and/or AC power supply 50 at the surface 11 utilize a variable input voltage power supply regulator that is configured to operate over a range of input voltages. The power supply regulator is configured to maintain a constant voltage level despite changes in the input voltage, in embodiments. Further, in embodiments, the DC power supply 7 and/or AC power supply 50 do not require high surge currents to start-up and/or regulate (e.g., the power supplies 7, 50 may be configured to start-up and/or operate under low surge current conditions), thus enabling these components to operate properly despite electrical series impedances being present between the power supplies and the source. This feature may further enable the DC power supply 7 and/or AC power supply 50 to operate in a wide range of environmental conditions.

In embodiments, the power transmission system described herein includes a feedback mechanism that enables the DC power supply 7 and/or AC power supply 50 to reduce an amount of voltage being applied at the surface 11 when an excessive voltage is present at the Y-point 21 and/or in the downhole equipment 12. For example, as described herein, a fault in the cable 20 may cause an AC voltage to be present at the Y-point 21. If this AC voltage and/or another voltage at the Y-point 21 becomes excessive, the DC power supply 7 and/or AC power supply 50 may be configured to reduce an amount of voltage applied at the surface 11 in response to the excessive voltage condition. The feedback mechanism may be used to provide the DC power supply 7 and/or AC power supply 50 with an indication of the voltage at the downhole system, thus enabling the DC power supply 7 and/or AC power supply 50 to reduce its voltage accordingly.

Figure 5C:
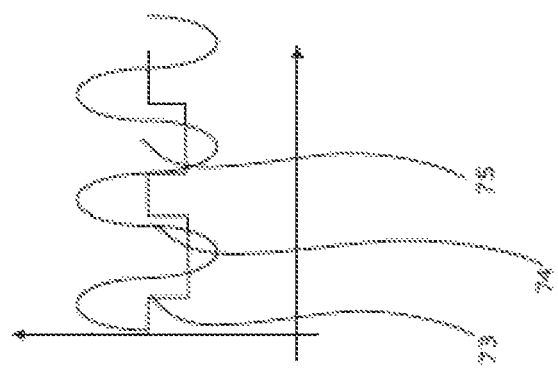
FIGS. 5A, 5B, and 5C are graphs depicting example voltages at a node Vg of the systems of FIGS. 1 and 4, according to an embodiment.
Figure 5B:
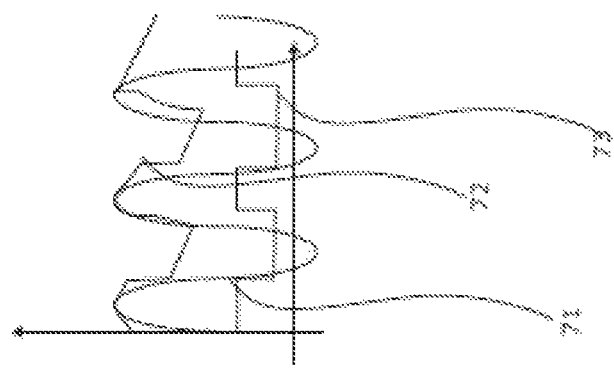
Figure 5A:
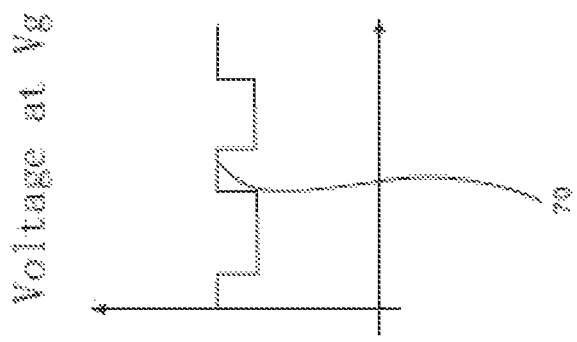

As described above, in embodiments, the DC power supply 7 is configured to generate variable DC voltages, which may be used in the transmission of commands (e.g., commands comprising data and/or information) from the surface 11 to the downhole equipment 12. For example, simple two-bit or three-bit pulse commands can be used where the data rates are slow enough so that each command pulse extends over several cycles of any AC power present, thus enabling relatively simple detection. To illustrate the use of such commands, reference is made to FIGS. 5A, 5B, and 5C. These figures depict the effect of simple pulse commands that are introduced by modulating the DC supply voltage provided by the DC supply 7, according to an embodiment. Voltages observed at a power recovery system of the downhole equipment 12 are shown, with the voltages specifically being at the node Vg 18 depicted in FIGS. 1 and 4. In FIGS. 5A-5C, a Y-axis represents a voltage at the node Vg 18, and an X-axis represents time.

FIG. 5A depicts an example voltage waveform at the node Vg 18 when the power cable 20 does not have a ground insulation fault. This figure shows that the voltage at the node Vg 18 is DC voltage 70 provided by the DC power supply 7, with command pulses being introduced by changing the amplitude of the DC voltage supply. In embodiments, the downhole equipment 12 includes a detector that is configured to detect and decode the power modulations to recover the transmitted commands. Such detectors configured to perform the detection and decoding operations are known to those of ordinary skill in the art.

FIG. 5B is a graph depicting example voltage waveforms at the node Vg 18 when the power cable 20 has an insulation fault that is very low impedance. When the insulation fault is very low impedance there will be little or no DC power present, but there will be a high AC voltage at the motor Y-point 21. The attenuator circuit attenuates the AC voltage, as shown at waveform 71 of FIG. 5B. The voltage regulator, including the diode 15 and smoothing capacitor 23, generates a single-wave rectified version of the attenuated AC voltage, as shown at waveform 72 of FIG. 5B. As described herein, power derived from the rectified voltage is used to drive components of the downhole system 12. In examples, data transmission from the surface 11 to the downhole equipment 12 (e.g., via modulated command pulses in the DC voltage) is not operable when the cable 20 has a fault that is very low impedance.

FIG. 5C is a graph depicting example voltage waveforms at the node Vg 18 when the power cable 20 has a resistive but not severe fault. When a resistive but not severe fault occurs there may be some reduced level of DC power available on the motor Y-point 21 and also some AC power available at the Y-point 21. The reduced level of DC power is represented by voltage waveform 73 of FIG. 5C, and the AC power is represented by the waveform 74. The voltage represented by the waveform 74 may be a voltage that has been attenuated by the attenuator circuit. The voltage regulator, including the diode 15 and smoothing capacitor 23, generates a single-wave rectified version of the attenuated AC voltage, as shown at waveform 75 of FIG. 5C. As described herein, power derived from the rectified voltage is used to drive components of the downhole system 12. In examples, data transmission from the surface 11 to the downhole equipment 12 via the modulated command pulses may continue when the power cable 20 has a resistive but not severe fault.

Figure 6:
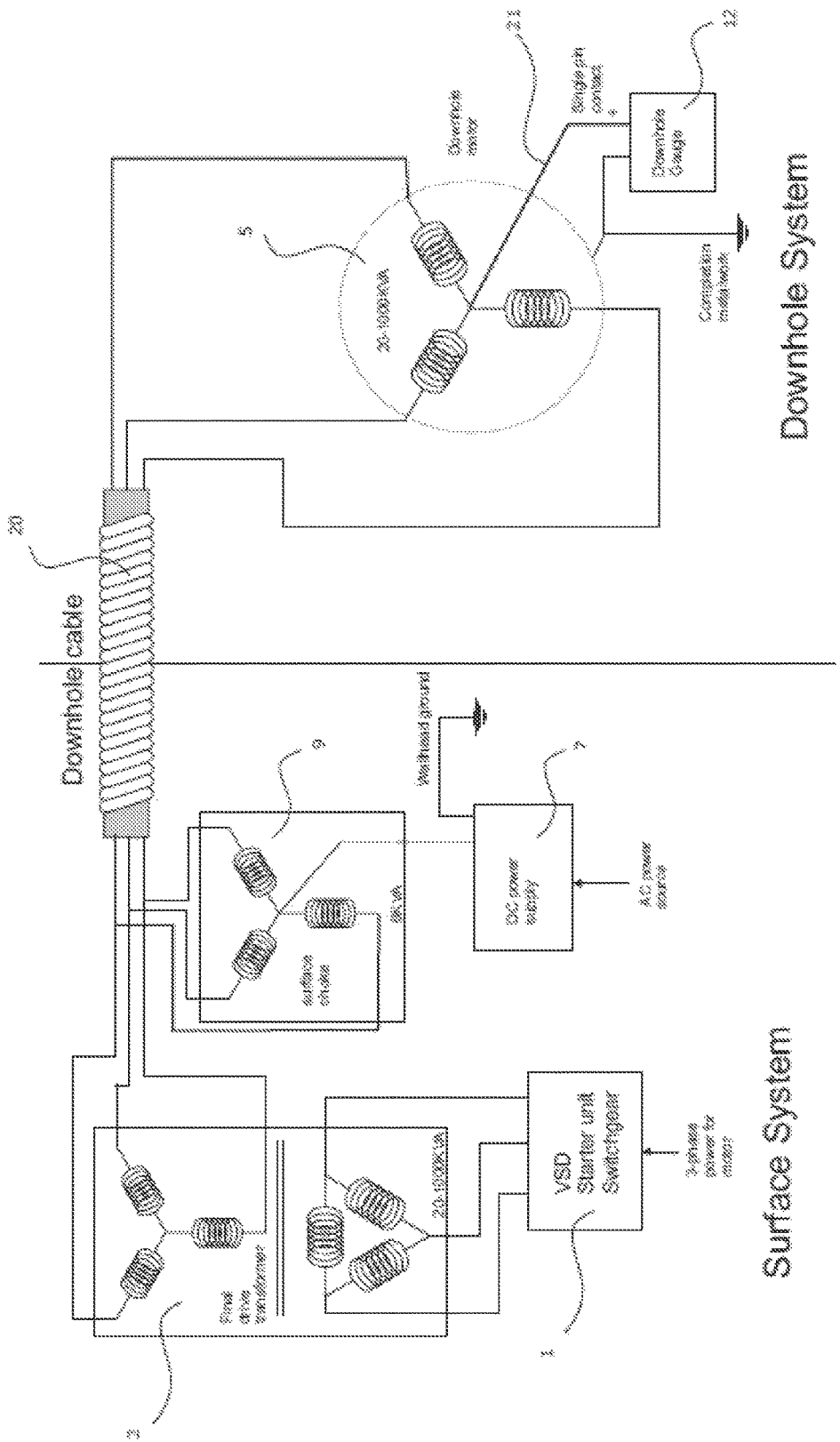
FIG. 6 is a diagram illustrating a simple instrument system with no faults present.

FIG. 6 shows a simplified diagram of a complete ESP and gauge system. The main pump supply consists of a variable speed drive 1 and a step up transformer 2 connected to the down hole system via the cable 20. Also illustrated is the motor 5 in the down hole pumping system, with illustrative power ratings that can be used in certain applications. The gauge system is shown with surface power supply 7 coupled to the 3-phase power system through a star point connected choke 9. As previously discussed in connection with FIG. 4, the power supply 7 may have DC and AC power source components, although a person of skill in the art would appreciate that different embodiments are possible, in which only one such component, for example DC power supply, can be used. As part of the downhole system, a downhole gauge 12 is illustrated, attached to the motor Y-point 21 on one side, and ground voltage (such as the completion metalwork). Sensor module 12 may contain one or more components (e.g., electronics, sensors, gauges, etc.), as previously described.

Figure 7:
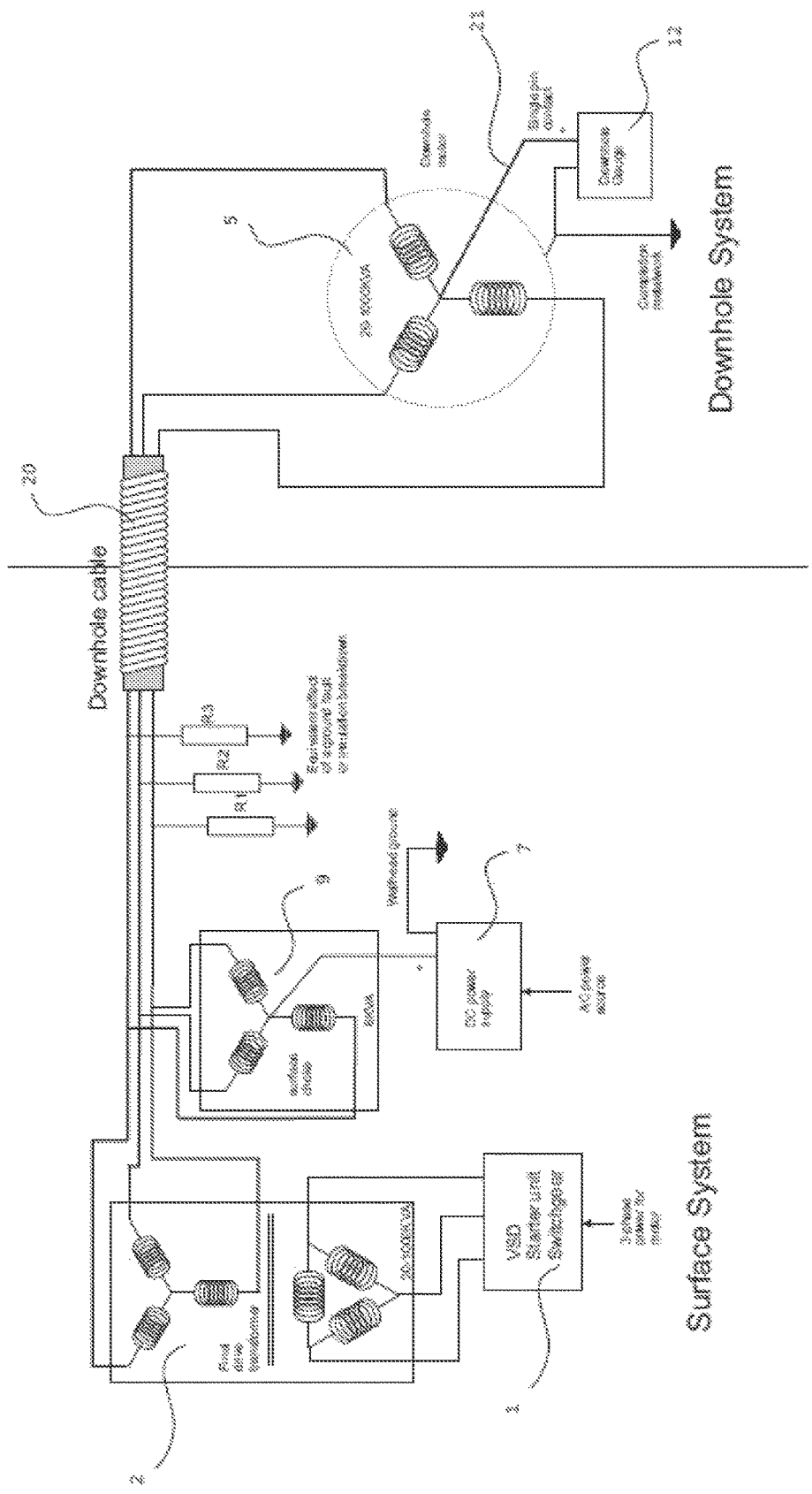
FIG. 7 is a diagram showing a complete pumping system with pump and gauge system, and with resistors depicting ground faults of the power cable.

FIG. 7 shows a complete ESP and gauge system substantially similar to the one shown in FIG. 6, but also including cable ground faults. As discussed above, the ground faults which are typically caused by chemical or mechanical breakdown of the cable insulation are shown in this figure by resistors R1, R2, and R3, which are all connected to ground. As in FIG. 6, the main pump supply consisting of a variable speed drive 1 and a step up transformer 2 is connected to the downhole system via the cable 20, while in the simplified diagram the down hole pumping system is illustrated by the motor 5. The gauge system is shown with surface power supply 7 coupled to the 3-phase power system through a star point connected choke 9, and with a gauge 12 attached to the motor Y-point 21.

Figure 8:
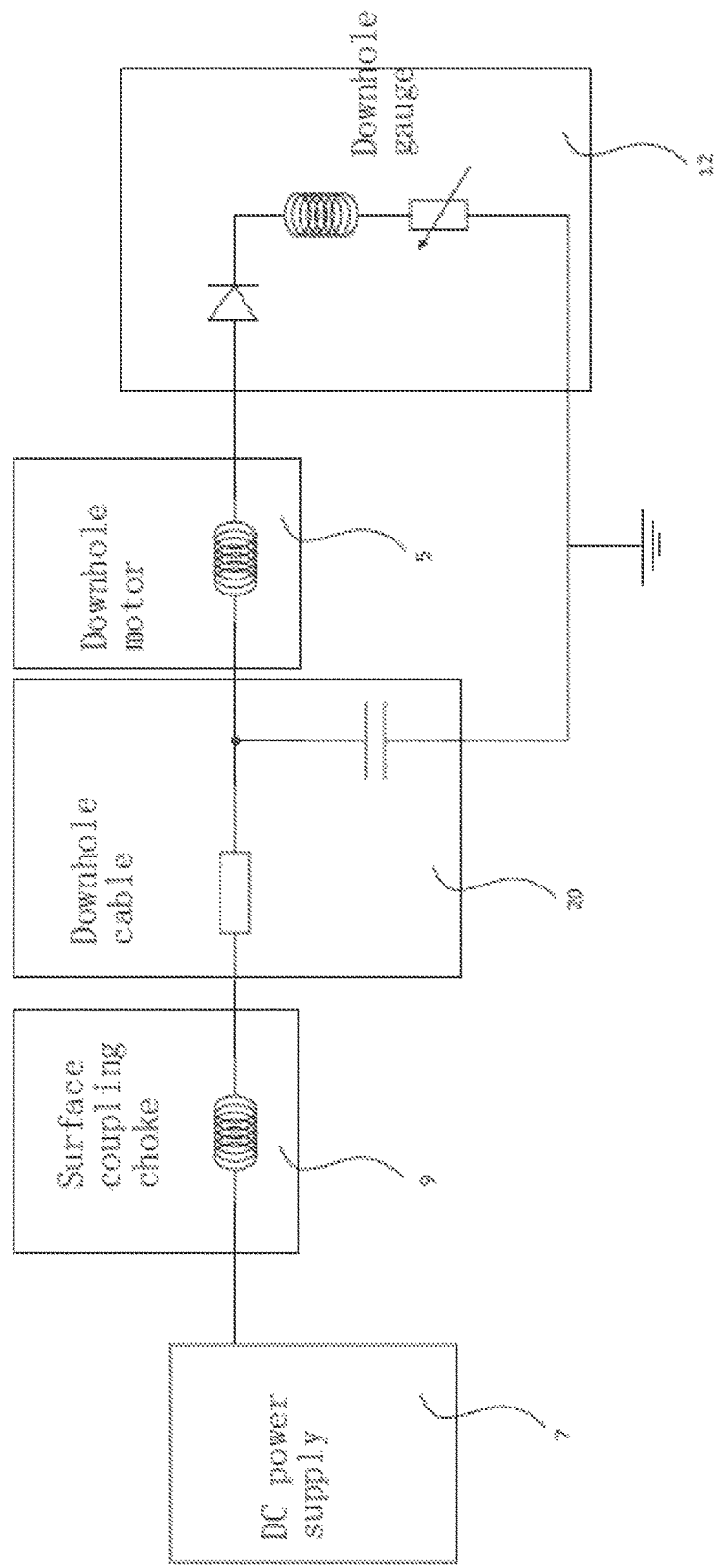
FIG. 8 is an equivalent circuit for an ESP gauge system with no cable faults present.

FIG. 8 simplifies the complete electrical system and presents it as a simplified equivalent circuit, where the basic electrical properties of the parts of the system are represented, and the components on all 3 phases are shown as one component consisting of the 3 legs of the cable in parallel, as it appears to the gauge system. For simplicity, like reference numbers designate the same component parts as in FIG. 6.

Figure 9:
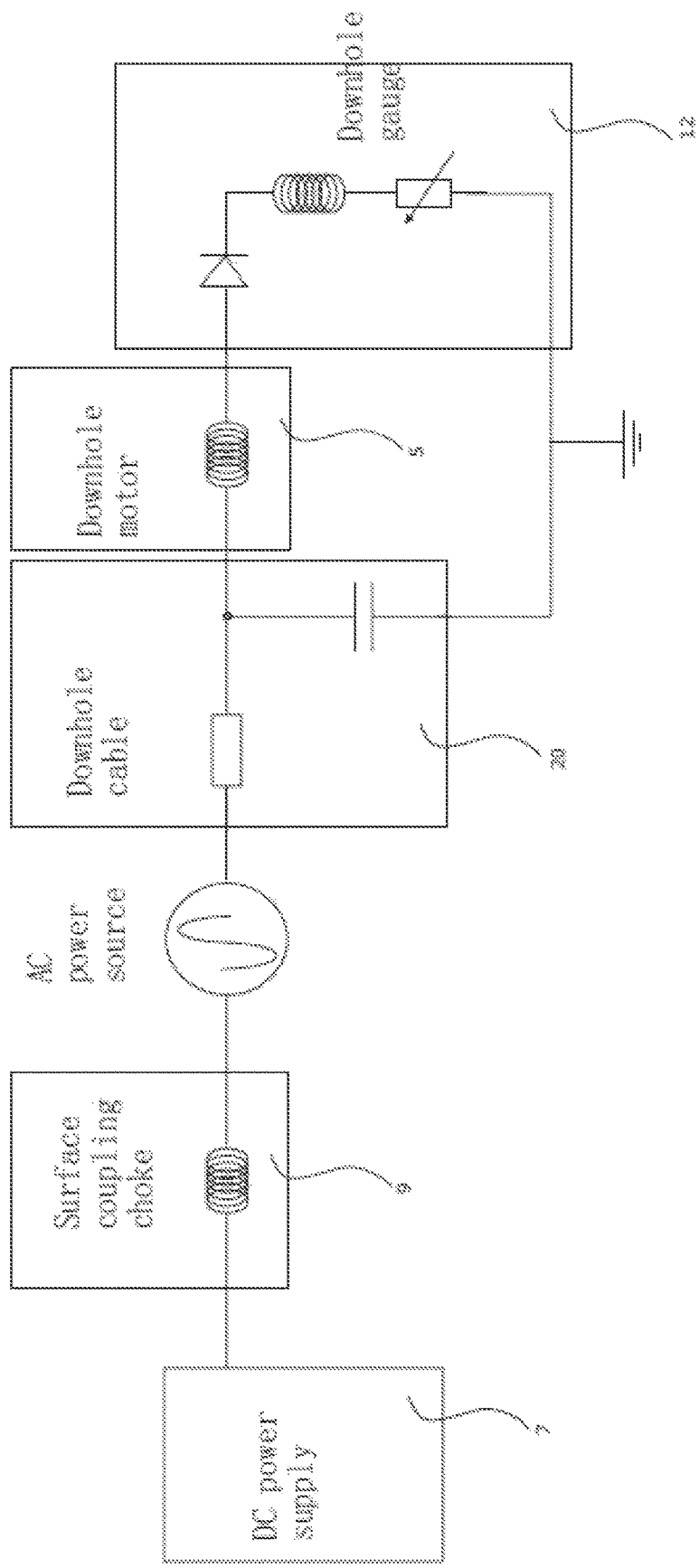
FIG. 9 is an equivalent circuit for an ESP gauge system with imbalance in the motor or cable system.

FIG. 9 is substantially similar to FIG. 8, as it shows an equivalent circuit for the complete electrical system, but with imbalance present due to either the downhole cable 20 or the downhole motor.

Figure 10:
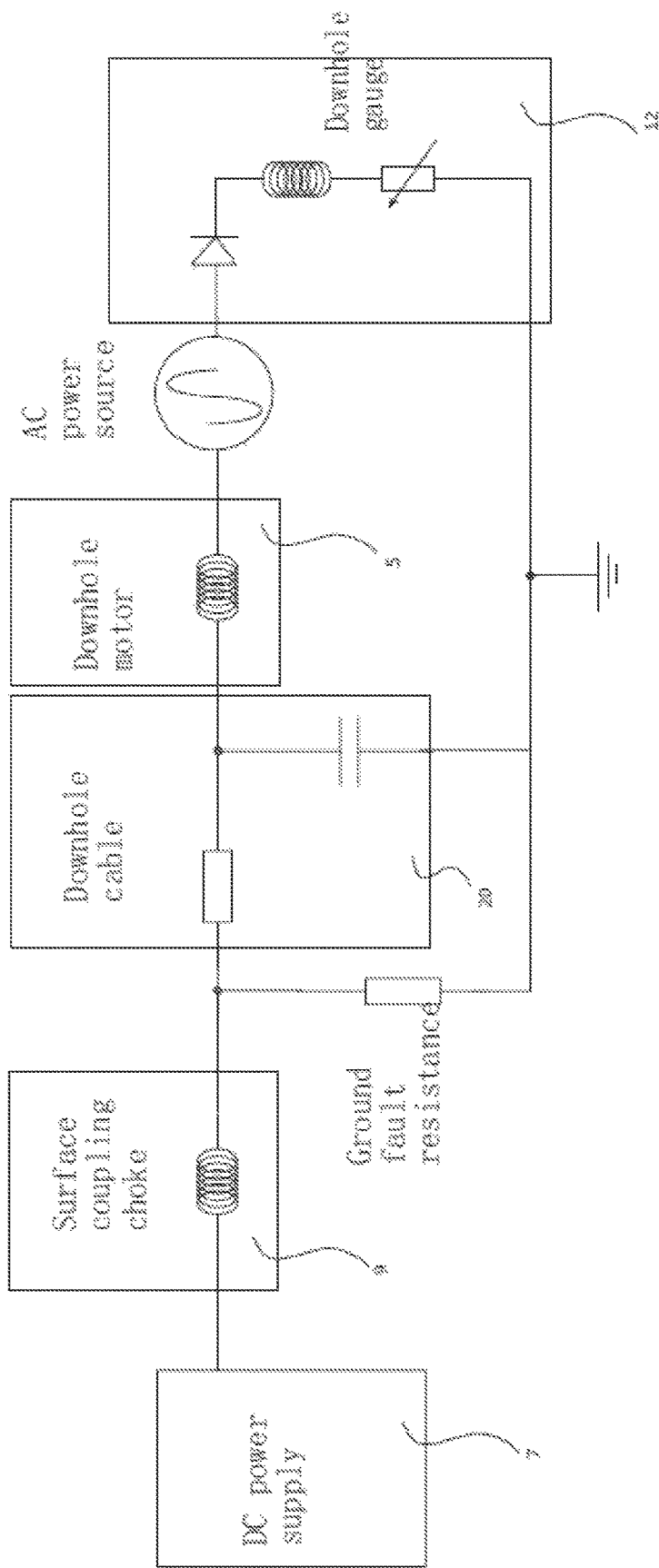
FIG. 10 is an equivalent circuit for an ESP gauge system with ground faults present.

FIG. 10 shows a further equivalent circuit for the complete pump and gauge system as seen by the gauge system. This diagram shows the effect of ground fault conditions, creating an AC power source inside the sensor power circuit. FIG. 10 shows in a very simplified form why if the downhole gauge unit can run on DC or AC power it can adapt when the ground fault resistance loads the surface DC supply, by operating from the AC power now present from the ESP motor system.

Figure 11:
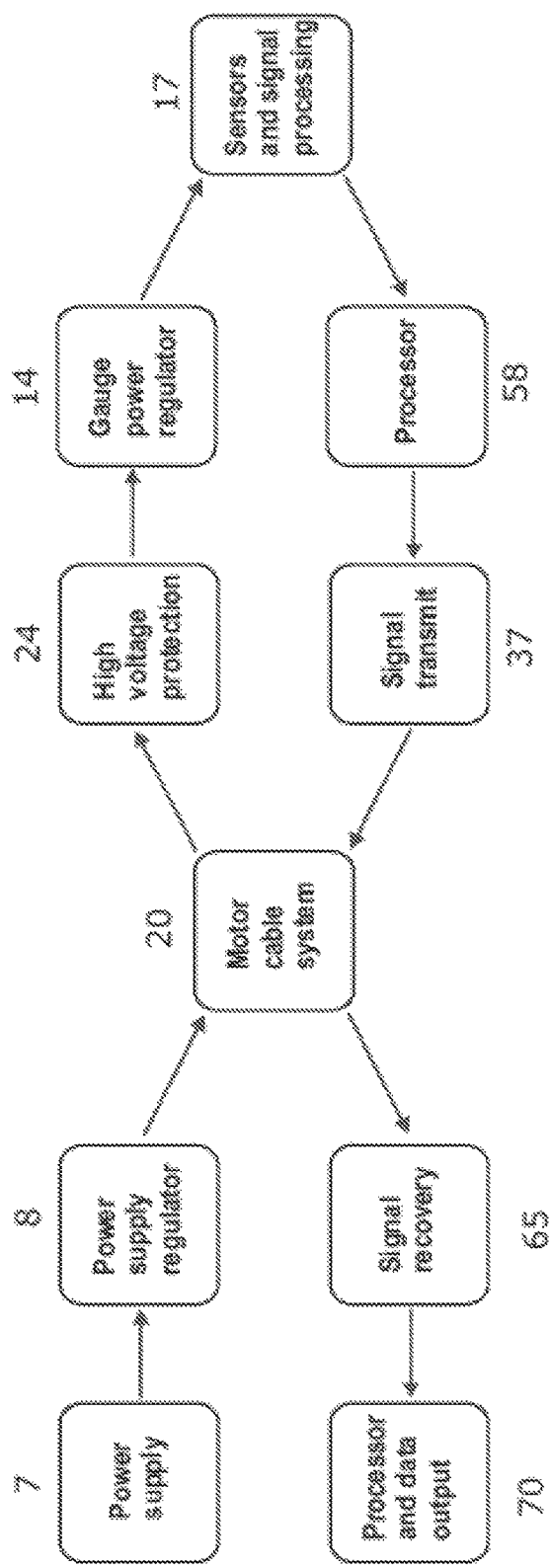
FIG. 11 is a block diagram of a complete downhole gauge system.

FIG. 11 is a block diagram of a power transmission system with ESP downhole monitoring feedback. Reference numerals generally correspond to like components discussed in earlier figures. As illustrated, power supply 7 and supply regulator 8 are used on the surface location side to power various monitoring components located downhole under normal operating conditions. The power supply, which could be DC power supply or some combination of DC and AC power supply is passed through the motor cable system 20. At the downhole end, the received DC/AC power supply signals are passed through high voltage protection 24 and power regulator 14 and ultimately used to power sensors and signal processing equipment designated 17. The return path illustrated diagrammatically with arrows includes a processor 58, which receives monitoring signals from the various downhole sensors and circuits 17, and converts these signals into digital measurement or component-related data, or some selection of amplitude, phase or pulse width modulation that can convey similar data or information in an analog manner. Details of such data processing are known in the art and need not be discussed in further detail. The sensor data or information thus processed is passed through a signal transmit circuit 37 that modulates and amplifies the signal in a manner known to those of skill in the art, and conveys the signal for transmission to the surface location via the motor cable system 20.

At the surface end, the received signal is recovered, amplified and appropriately shaped in signal recovery component 65, and passed on to processor and data output block 70, where the received measurement or downhole component data is monitored and may be acted upon as appropriate. In accordance with one aspect of the present invention, the ability of the downhole sensors and circuits to be powered over a range of system conditions, including ground faults, provides significant benefits to the system operators by enabling downhole data and signal communication to continue under adverse conditions that may incapacitate prior art systems, and cause blind operation or even abandonment of the downhole equipment.

This disclosure uses examples to illustrate the invention. It will be appreciated that the patentable scope of the invention may include other examples constructed consistent with the teachings of the disclosure. It is also noted that the figures described herein are not to scale. Certain features of the instant disclosure may be shown exaggerated in scale or in schematic form, and some details of conventional elements may not be shown in the interest of clarity and conciseness. It is to be recognized that the different teachings of the embodiments discussed herein may be employed separately or in any suitable combination to produce the desired results. Accordingly, the invention is limited only by the scope of the attached claims.

What is claimed is:

1. A three-phase power transmission system for transmitting power over a multi-conductor power cable between a surface location and a sub-surface location, the power transmission system comprising:
   a surface system comprising a power supply providing direct current (DC) power to the multiconductor power cable; and
   a sub-surface system coupled to the surface system via the multi-conductor power cable, the subsurface system comprising a downhole motor including a Y-point, and
   a downhole system coupled between the Y-point and a ground reference voltage, the downhole system configured to be powered, dependent on the operating conditions of the power transmission system, by (i) the DC power provided by the surface system, (ii) alternating current (AC) power drawn from the Y-point, or (iii) a combination of the DC power and the AC power;
   wherein the downhole system is powered at least in part based on an AC voltage at the Y-point when the power cable has an insulation fault, the insulation fault causing the AC voltage to be present at the Y-point, and wherein the downhole system comprises:
   one or more measurement circuits and sensors;
   an attenuator circuit coupled to the Y-point and being configured to attenuate the AC voltage at the Y-point, and
   a regulator circuit coupled to the attenuator circuit and configured to power the one or more measurement circuits or sensors based on the attenuated voltage;
   wherein the attenuator circuit comprises: an inductor coupled to the Y-point and a resistor connected in series with the inductor;
   wherein the regulator circuit comprises: a rectifier circuit coupled to the resistor of the attenuator circuit and being configured to generate a rectified voltage for powering the one or more measurement devices, sensors, or circuits from the attenuated AC voltage;
   wherein the rectifier circuit comprises: a diode connected in series with the resistor of the attenuator circuit and a smoothing capacitor connected to the diode, wherein the diode and the smoothing capacitor are configured to provide rectified voltage signal for powering the one or more measurement devices, sensors, or circuits from the attenuated AC voltage;
   wherein the downhole system further comprises a voltage-limiting device connected in parallel with the smoothing capacitor, the voltage limiting device limiting voltage applied across one or more components of the downhole system.

2. The power transmission system of claim 1, wherein the downhole system is configured to be powered by the AC power or a combination of the DC power and the AC power when the multi-conductor power cable has an insulation fault, the insulation fault causing AC voltage to be present at the Y-point of the motor.

3. The power transmission system of claim 1, wherein the power supply comprises a DC power supply, and wherein the surface system further comprises:
   an AC power supply coupled to the multi-conductor power cable and being configured to provide an AC power to the multi-conductor power cable, the AC power being provided in parallel with the DC power provided by the DC power supply.

4. The power transmission system of claim 1, wherein the downhole system further comprises:
   an active voltage regulation circuit configured to limit the voltage across one or more components of the downhole system.

5. The power transmission system of claim 1, wherein the downhole motor is a three-phase motor including motor windings, and wherein the motor windings comprise:
   one or more current transformers, each current transformer being configured to generate an AC current in a secondary winding that is proportional to an input current in a primary winding, the AC current being coupled to the Y-point to provide power to the downhole system.

6. The power transmission system of claim 1, wherein an insulation fault in the power cable sinks a first amount of current provided by the power supply, and wherein the power supply is configured to generate a fault current that is in addition to the first amount of current, the fault current providing additional power for powering the downhole system when the power cable has the insulation fault.

7. The power transmission system of claim 1, wherein the power supply comprises:
   a variable input voltage power supply regulator configured to operate over a range of input voltages, the power supply regulator being configured to maintain a constant voltage level despite changes in the input voltage.

8. The power transmission system of claim 1, wherein the power supply is configured to start-up under low surge current conditions.

9. The power transmission system of claim 1, wherein the power supply is configured to transmit commands from the surface system to the sub-surface system by modulating a DC power supply voltage at the surface system, and wherein the downhole system comprises:
   a detector configured to detect and decode the power modulations to recover the transmitted data and/or commands.

10. A downhole system coupled to a Y-point of a sub-surface motor operating an electric submersible pump, the sub-surface motor being coupled to a surface system via a three-phase power cable, the downhole system comprising:
   one or more measurement devices, sensors, or circuits;

an attenuator circuit coupled to the Y-point of the subsurface motor, the attenuator circuit being configured to attenuate an alternating current (AC) voltage that is present at the Y-point;

a regulator circuit coupled to the attenuator circuit, the regulator circuit being configured to power the one or more measurement devices, sensors, or circuits based on the attenuated voltage;

wherein the attenuator circuit comprises: an inductor coupled to the Y-point and a resistor connected in series with the inductor;

wherein the regulator circuit comprises: a rectifier circuit coupled to the resistor and being configured to generate a rectified voltage for powering the one or more measurement devices, sensors, or circuits based on the attenuated AC voltage;

wherein the rectifier circuit comprises: a diode connected in series with the resistor of the attenuator circuit and a smoothing capacitor connected to the diode, wherein the diode and the smoothing capacitor are configured to provide rectified voltage signal for powering the one or more measurement devices, sensors, or circuits;

wherein the downhole system further comprises a voltage-limning device connected in parallel with the smoothing capacitor, the voltage limiting device limiting voltage applied across one or more components of the downhole system.

11. The downhole system of claim 10, wherein the downhole system further comprises:

an active voltage regulation circuit configured to limit the voltage across one or more components of the downhole system.

* * * * *